US012692452B2

(12) United States Patent
    Zhu et al.

(10) Patent No.: US 12,692,452 B2
(45) Date of Patent: Jul. 28, 2026

(54) INTEGRATED PROCESS AND SYSTEM FOR MEASUREMENT AND TREATMENT OF TOXIC GASES IN DEEP NATURAL GAS

(71) Applicant: PetroChina Company Limited, Beijing (CN)

(72) Inventors: Guangyou Zhu, Beijing (CN); Zhiyong Chen, Beijing (CN); Meng Wang, Beijing (CN); Tingting Li, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 691 days.

(21) Appl. No.: 18/036,751

(22) PCT Filed: Oct. 26, 2021

(86) PCT No.: PCT/CN2021/126249
    § 371 (c)(1),
    (2) Date: May 12, 2023

(87) PCT Pub. No.: WO2022/105548
    PCT Pub. Date: May 27, 2022

(65) Prior Publication Data
    US 2023/0407199 A1     Dec. 21, 2023

(30) Foreign Application Priority Data
    Nov. 17, 2020    (CN) .......................... 202011286582.6

(51) Int. Cl.
    E21B 43/34        (2006.01)
    B01D 46/00        (2022.01)
        (Continued)

(52) U.S. Cl.
    CPC .......... C10L 3/103 (2013.01); B01D 46/0036 (2013.01); C10L 3/101 (2013.01);
        (Continued)

(58) Field of Classification Search
    None
    See application file for complete search history.

(56) References Cited

U.S. PATENT DOCUMENTS

| | | |
|---|---|---|
| 3,940,471 A | 2/1976 | Favre |
| 4,786,483 A | 11/1988 | Audeh |

(Continued)

FOREIGN PATENT DOCUMENTS

| | | |
|---|---|---|
| CN | 101832955 A | 9/2010 |
| CN | 103293258 A | 9/2013 |

(Continued)

OTHER PUBLICATIONS

First Office Action and Search Report issued on Jan. 29, 2024 for counterpart Russia Patent Application No. 2023115297, along with the English translation, 13 pgs.

(Continued)

*Primary Examiner* — Daniel Berns
(74) *Attorney, Agent, or Firm* — LOZA & LOZA, LLP; Michael F. Fedrick

(57)        ABSTRACT

An integrated process and system for measurement and treatment of toxic gases in deep natural gas. The process comprises: cooling and depressurizing deep natural gas and then drying same; sequentially performing radon, hydrogen sulfide, and mercury measurements on the dried deep natural gas; if it is found after the measurements that the concentrations of radon, hydrogen sulfide, and mercury in the deep natural gas are substandard, sequentially performing harmless treatment on radon and partial mercury, hydrogen sulfide, and remaining mercury in the deep natural gas; sequentially performing mercury, radon, and hydrogen sulfide measurements on the deep natural gas having experienced the harmless treatment; and if the concentrations of mercury, radon, and hydrogen sulfide in the deep natural gas are substandard, continuing to sequentially perform harm- (Continued)

less treatment on radon and partial mercury, hydrogen sulfide, and remaining mercury in the deep natural gas, until the concentrations thereof reach the standards.

20 Claims, 3 Drawing Sheets

(51) Int. Cl.
*C10L 3/10* (2006.01)
*G01N 23/00* (2006.01)

(52) U.S. Cl.
CPC ............. *E21B 43/34* (2013.01); *G01N 23/00* (2013.01); *G01N 2223/01* (2013.01); *G01N 2223/1045* (2013.01); *G01N 2223/638* (2013.01)

(56) References Cited

U.S. PATENT DOCUMENTS

| | | | |
|---|---|---|---|
| 5,149,343 | A | 9/1992 | Sowinski |
| 2008/0047370 | A1 | 2/2008 | Vickery, Jr. |
| 2017/0115010 | A1 | 4/2017 | Martino et al. |
| 2020/0132648 | A1 | 4/2020 | Zhu et al. |
| 2020/0232959 | A1 | 7/2020 | Armitage |

FOREIGN PATENT DOCUMENTS

| | | | |
|---|---|---|---|
| CN | 205067411 | U | 3/2016 |
| CN | 106833783 | A | 6/2017 |
| CN | 108627368 | A | 10/2018 |
| CN | 108717106 | A | 10/2018 |
| CN | 108956238 | A | 12/2018 |
| CN | 109253995 | A | 1/2019 |
| CN | 109477790 | A | 3/2019 |
| CN | 110320251 | A | 10/2019 |
| CN | 210974566 | U | 7/2020 |
| CN | 112683960 | A | 4/2021 |
| CN | 112710804 | A | 4/2021 |
| CN | 112710807 | A | 4/2021 |
| CN | 112710812 | A | 4/2021 |
| JP | S5767183 | A | 4/1982 |
| JP | 2011174812 | A | 9/2011 |
| RU | 2176927 | C2 | 12/2001 |
| RU | 2624160 | C1 | 6/2017 |

OTHER PUBLICATIONS

International Search Report for International Patent Application No., dated Jan. 19, 2022.
International Search Report for Chinese Patent Application No. 202011286582.6, dated Feb. 24, 2022, 4 pages.
International Search Report for International Patent Application No. PCT/CN2021/126249, dated Jan. 19, 2022, 4 pages.
Novelty search report prepared by China Patent Information Center relating to "Integrated process and system for detecting and treating toxic gases in deep natural gas," dated Oct. 26, 2020, 10 pages.

INTEGRATED PROCESS AND SYSTEM FOR MEASUREMENT AND TREATMENT OF TOXIC GASES IN DEEP NATURAL GAS

CROSS-REFERENCE TO RELATED APPLICATIONS

This application is the U.S. national stage of International Patent Application No. PCT/CN2021/126249, filed on Oct. 26, 2021, which claims the benefit of priority under 35 U.S.C. § 119 from Chinese Patent Application No. 202011286582.6, filed on Nov. 17, 2020, both of which are hereby incorporated by reference in their entireties.

FIELD OF TECHNOLOGY

The present invention relates to an integrated process and system for detecting and treating toxic gases in deep-seated natural gas, and belongs to the technical field of oil and gas exploration, safety production and occupational disease prevention.

BACKGROUND OF ART

As oil and gas exploration expands into deeper and unconventional areas, more and more natural gas is being discovered and exploited, greatly relieving the tight supply of natural gas in China. However, these deep-sourced and unconventional types of natural gas contain more or less toxic and hazardous components, some of which seriously exceed the standard, posing a threat to safety production and life and health. In the past natural gas treatment, hydrogen sulfide has attracted attention due to its abnormal odor, and many high hydrogen sulfide containing natural gas have been desulfurized. However, radon and mercury in these deep-sourced and unconventional types of natural gas have not yet attracted attention. Among them, radon is a radioactive gas, which is one of the 19 major carcinogens announced by the World Health Organization. The biological effects of radon are mainly focused on respiratory tumors, pulmonary fibrosis and emphysema, and it is the second major culprit in causing human lung cancer. Radon originates from deep crust and is transported to gas reservoirs along fractures. There is no effective means to deal with it, and ordinary oil and gas operators know little about it. Mercury is a common associated gas in natural gas, and its content tends to be high in coal-forming (seam) gas and shale gas, and it is also high near fracture zones. Mercury is a toxic and hazardous gas, which on the one hand has a hazardous effect on the human body, and inhalation of high concentrations of mercury can lead to chronic diseases with psycho-neurological abnormalities, gingivitis and tremors as the main symptoms; on the other hand, mercury has a serious corrosive effect on pipelines during transportation, which has caused several major safety accidents.

Therefore, it is necessary to invent an integrated system and process to jointly treat hazardous gases, such as radon, mercury and hydrogen sulfide, in deep-sourced and unconventional types of natural gas, to ensure safe production and the life and health of related operators, making the clean energy from natural gas truly clean.

SUMMARY OF INVENTION

In order to solve the above-mentioned disadvantages and shortcomings, one object of the present invention is to provide a device for detecting toxic gases in deep-seated natural gas (shale gas and tight gas).

Another object of the present invention is to provide an integrated system for detecting and treating toxic gases in deep-seated natural gas.

A further object of the present invention is to provide an integrated process for detecting and treating toxic gases in deep-seated natural gas.

In order to achieve the above objects, in one aspect, the present invention provides a device for detecting toxic gases in deep-seated natural gas, comprising: a power supply, a display, an electrical signal amplifier, a first electrical signal processor, a second electrical signal processor, and a third electrical signal processor, and a radon detection chamber, a hydrogen sulfide detection chamber and a mercury detection chamber configured to communicate in this order;

wherein the radon detection chamber is provided with an alpha detector electrically connected to an input end of the first electrical signal processor, and an output end of the first electrical signal processor is electrically connected to the display via the electrical signal amplifier; a gas inlet of the radon detection chamber is provided with a detachable filter layer for filtering and removing radon daughters in the deep-seated natural gas;

wherein the hydrogen sulfide detection chamber is provided with a heating plate, and an inductor plate provided with a metal oxide semiconductor on a surface thereof and electrically connected to an input end of the second electrical signal processor, and an output end of the second electrical signal processor is electrically connected to the display via the electrical signal amplifier;

wherein the mercury detection chamber contains a permanganate solution and provided with two conductive plates partially immersed in the permanganate solution, and the portions of the conductive plates that are not immersed in the permanganate solution are electrically connected to an input end of the third electrical signal processor, and an output end of the third electrical signal processor is electrically connected to the display via the electrical signal amplifier; and wherein the power supply is used to apply a voltage to each of the radon detection chamber and the mercury detection chamber.

In the device for detecting toxic gases in deep-seated natural gas of the present invention, the detachable filter layer is provided at a gas inlet of the radon detection chamber to filter and remove radon daughters formed by decay of radon gas contained in the deep-seated natural gas before it enters the radon detection chamber, so as to ensure that the radon detected in the radon detection chamber is the radon daughters formed by the decay of radon gas in the deep-seated natural gas after entering the radon detection chamber, and thus avoid the interference of the pre-existing radon daughters to radon gas detection.

As a specific embodiment of the device of the present invention, the filter layer is a filter layer made of glass fiber.

As a specific embodiment of the device of the present invention, the volume of the permanganate solution is ½ to ⅔ of the volume of the mercury detection chamber.

As a specific embodiment of the device of the present invention, the two conductive plates are immersed in the permanganate solution to a depth of ½ to ¾.

In a specific embodiment of the present invention, the concentration of permanganate ($MnO_4^-$) in the permanganate solution is 0.5 mmol/L.

As a specific embodiment of the device of the present invention, the two conductive plates may be an integrated U-shaped conductive plate.

As a specific embodiment of the device of the present invention, the alpha detector is an Au—Si surface barrier semiconductor detector.

As a specific embodiment of the device of the present invention, the Au—Si surface barrier semiconductor detector has a surface gold plating layer with a thickness of 0.1-0.12 mm.

As a specific embodiment of the device of the present invention, the heating plate is a platinum heating plate.

As a specific embodiment of the device of the present invention, the metal oxide semiconductor comprises $Pr_6O_{11}$ and/or $SnO_2$.

In a preferred embodiment of the present invention, the metal oxide semiconductor covers the inductor plate.

In another aspect, the present invention further provides an integrated system for detecting and treating toxic gases in deep-seated natural gas, comprising: a cooling and depressurization device, a drying device, two or more devices for detecting toxic gases in deep-seated natural gas as mentioned above, and a device for harmless treatment of toxic gases in deep-seated natural gas;

wherein a gas outlet of the cooling and depressurization device is connected to a gas inlet of the drying device via a pipeline, a gas outlet of the drying device is connected to an inlet of a first device for detecting toxic gases in deep-seated natural gas via a pipeline, an outlet of the first device for detecting toxic gases in deep-seated natural gas is connected to an inlet of the device for harmless treatment of toxic gases in deep-seated natural gas and a gas transmission pipeline via a pipeline respectively; an outlet of the device for harmless treatment of toxic gases in deep-seated natural gas is connected to an inlet of a second device for detecting toxic gases in deep-seated natural gas via a pipeline, and an outlet of the second device for detecting toxic gases in deep-seated natural gas is connected to an inlet of the device for harmless treatment of toxic gases in deep-seated natural gas and the gas transmission pipeline via a pipeline respectively.

As a specific embodiment of the system of the present invention, the system further comprises a gas-liquid separation device, wherein the deep-seated natural gas wellhead is connected to an inlet of the gas-liquid separation device via a pipeline, and a gas outlet of the gas-liquid separation device is connected to an inlet of the cooling and depressurization device via a pipeline.

Herein, a gas-liquid mixture is extracted from the deep-seated natural gas wellhead, and thus the gas-liquid separation device is needed to carry out a gas-liquid separation on the gas-liquid mixture to obtain the deep-seated natural gas.

As a specific embodiment of the system of the present invention, the device for harmless treatment of toxic gases in deep-seated natural gas comprises a radon treatment chamber; the radon treatment chamber is provided with several mesh separators provided with a bioactive adsorbent on the surface thereof.

As a specific embodiment of the system of the present invention, the device for harmless treatment of toxic gases in deep-seated natural gas further comprises a hydrogen sulfide spray removal chamber and/or a mercury treatment chamber; when the device for harmless treatment of toxic gases in deep-seated natural gas comprises the radon treatment chamber and the hydrogen sulfide spray removal chamber, or the radon treatment chamber and the mercury treatment chamber, the radon treatment chamber and the hydrogen sulfide spray removal chamber are configured to communicate in this order, and the radon treatment chamber and the mercury treatment chamber are configured to communicate in this order;

wherein the hydrogen sulfide spray removal chamber is provided with a shower device on the top thereof, and the shower device is used to spray a hydrogen sulfide scavenger from top to bottom into the hydrogen sulfide spray removal chamber; and wherein the mercury treatment chamber is provided with several hazardous gas treatment meshes filled with melamine-modified bentonite.

In the system provided by the present invention, one skilled in the art can reasonably choose the type of treatment chamber that needs to be provided for the device for harmless treatment of toxic gases in deep-seated natural gas depending on the below-standard state of the detected toxic gases in deep-seated natural gas. Specifically, when only the concentration of radon gas in the deep-seated natural gas does not reach the standard, only the radon treatment chamber needs to be provided for the device for harmless treatment of toxic gases in deep-seated natural gas. Under the conditions of the present invention, mercury and hydrogen sulfide in the deep-seated natural gas will react and not coexist in high concentrations, i.e., in the deep-seated natural gas, mercury and hydrogen sulfide will not be below-standard simultaneously. Therefore, when only the concentration of mercury or hydrogen sulfide in the deep-seated natural gas does not reach the standard, only the mercury treatment chamber or the hydrogen sulfide spray removal chamber needs to be provided for the device for harmless treatment of toxic gases in deep-seated natural gas; when the concentrations of radon gas and mercury in the deep-seated natural gas do not reach the standard, the radon treatment chamber and the mercury treatment chamber configured to communicate in this order need to be provided for the device for harmless treatment of toxic gases in deep-seated natural gas; and when the concentrations of radon gas and hydrogen sulfide in the deep-seated natural gas do not reach the standard, the radon treatment chamber and the hydrogen sulfide spray removal chamber configured to communicate in this order need to be provided for the device for harmless treatment of toxic gases in deep-seated natural gas.

As a specific embodiment of the system of the present invention, the bioactive adsorbent is biological activated carbon. In a preferred embodiment of the present invention, the biological activated carbon may be activated carbon enriched with mercury and radon gas-loving bacteria, which is a conventional substance commercially available.

In the present invention, the way of providing the bioactive adsorbent on the surface of the mesh separator is not particularly limited, and a person skilled in the art can provide the bioactive adsorbent on the surface of the mesh separator according to the actual needs in site, so as to ensure that the purpose of the present invention can be achieved.

As a specific embodiment of the system of the present invention, the several mesh separators are provided in the radon treatment chamber, perpendicular to the direction of the gas entering the gas inlet of the radon treatment chamber, and the several mesh separators form an S-shaped gas channel in the radon treatment chamber. For example, in a specific embodiment of the present invention, the gas inlet of the radon treatment chamber is provided at the side wall of the radon treatment chamber, such that the several mesh separators are provided in the radon treatment chamber, perpendicular to the bottom and top surfaces of the radon treatment chamber. At this time, it is also possible to ensure that the several mesh separators are perpendicular to the direction of the gas entering the radon treatment chamber through the gas inlet at the side wall.

As a specific embodiment of the system of the present invention, the hydrogen sulfide spray removal chamber is provided with a circulation pipe on the inner side wall thereof, and the circulation pipe is connected to the shower device via a circulation pump, to return the hydrogen sulfide scavenger to the shower device.

As a specific embodiment of the system of the present invention, the hazardous gas treatment meshes are provided in the mercury treatment chamber, perpendicular to the direction of the gas entering the gas inlet of the mercury treatment chamber. For example, in a specific embodiment of the present invention, the gas inlet of the mercury treatment chamber is provided at the side wall of the mercury treatment chamber, such that the hazardous gas treatment meshes are provided in the mercury treatment chamber, perpendicular to the bottom and top surfaces of the mercury treatment chamber. At this time, it is also possible to ensure that the hazardous gas treatment meshes are perpendicular to the direction of the gas entering the mercury treatment chamber through the gas inlet at the side wall.

As a specific embodiment of the system of the present invention, the hazardous gas treatment meshes are stainless steel metal meshes.

In a further aspect, the present invention further provides an integrated process for detecting and treating toxic gases in deep-seated natural gas using the integrated system for detecting and treating toxic gases in deep-seated natural gas mentioned above, comprising:

drying the deep-seated natural gas after cooling and depressurization;

detecting the dried deep-seated natural gas for radon, hydrogen sulfide and mercury successively;

sending the deep-seated natural gas to the gas transmission pipeline if the detected concentrations of mercury, radon and hydrogen sulfide in the dried deep-seated natural gas reach the standard; or preforming a harmless treatment on the below-standard radon and hydrogen sulfide or mercury in the deep-seated natural gas if the detected concentrations of radon and hydrogen sulfide or mercury in the deep-seated natural gas do not reach the standard; and detecting the deep-seated natural gas after the harmless treatment for radon, hydrogen sulfide and mercury successively, and sending the deep-seated natural gas to the gas transmission pipeline if the concentrations of mercury, radon and hydrogen sulfide in the deep-seated natural gas reach the standard; or continuing to perform the harmless treatment on the below-standard radon and hydrogen sulfide or mercury in the deep-seated natural gas if the concentrations of radon and hydrogen sulfide or mercury in the deep-seated natural gas do not reach the standard, until all concentrations reach the standard.

As a specific embodiment of the process of the present invention, the deep-seated natural gas is cooled down to a temperature of not more than 55° C.

As a specific embodiment of the process of the present invention, the deep-seated natural gas after cooling has a temperature of 15-30° C.

As a specific embodiment of the process of the present invention, the deep-seated natural gas after cooling and depressurization has a temperature of 20° C. and a pressure of 2 MPa.

As a specific embodiment of the process of the present invention, when the mercury concentration is $\leq 0.01$ $\mu g/m^3$, the radon concentration is $\leq 4$ pci/L and the hydrogen sulfide concentration is $\leq 6$ $mg/m^3$ in the deep-seated natural gas, it is determined that the concentrations of mercury, radon and hydrogen sulfide in the deep-seated natural gas reach the standard. Herein, each of the mercury concentration, radon concentration and hydrogen sulfide concentration is calculated on the basis of the total volume of the deep-seated natural gas.

As a specific embodiment of the process of the present invention, wherein detecting the deep-seated natural gas for radon, hydrogen sulfide and mercury successively comprises:

allowing the deep-seated natural gas filtered through the filter layer to enter the radon detection chamber, the hydrogen sulfide detection chamber and the mercury detection chamber successively;

applying a voltage to the radon detection chamber such that the alpha detector collects radon daughters and converts the alpha particle energy, radiated by radon daughters upon alpha decay, into an electric pulse signal; the electric pulse signal is then converted into an electronic signal by the first electric signal processor; the electronic signal is shaped, amplified and converted into a voltage pulse signal by the electric signal amplifier, and then the voltage pulse signal is converted into a radon concentration value by the display and displayed on the display;

increasing the temperature of the inductor plate by the heating plate in the hydrogen sulfide detection chamber; wherein when the metal oxide semiconductor provided on the surface of the inductor plate detects hydrogen sulfide, the hydrogen sulfide reacts with oxygen ions in the metal oxide semiconductor, causing the resistance value of the metal oxide semiconductor to decrease; the second electrical signal processor converts the obtained resistance change signal into an electronic signal; the electronic signal is shaped, amplified and converted into a voltage pulse signal by the electric signal amplifier, and then the voltage pulse signal is converted into a hydrogen sulfide concentration value by the display and displayed on the display;

when the deep-seated natural gas enters the mercury detection chamber, the mercury contained therein reacts with the permanganate to generate electrons, which are collected by the positive and negative electrodes of the power supply and conducted to the third electrical signal processor through the conductive plate and converted into an electronic signal by the third electrical signal processor; the electronic signal is shaped, amplified and converted into a voltage pulse signal by the electric signal amplifier, and then the voltage pulse signal is converted into a mercury concentration value by the display and displayed on the display.

As a specific embodiment of the process of the present invention, the concentrations of mercury, radon and hydrogen sulfide of the dried deep-seated natural gas are detected for a period of time respectively, and the concentrations of mercury, radon and hydrogen sulfide obtained continuously for the period of time are averaged respectively as the mercury concentration, radon concentration and hydrogen sulfide concentration in the deep-seated natural gas.

As a specific embodiment of the process of the present invention, the permanganate comprises potassium permanganate.

As a specific embodiment of the process of the present invention, the voltage applied to the radon detection chamber is 1500-3000 V.

During the detection for hydrogen sulfide, the temperature of the inductor plate is increased by the heating plate in the hydrogen sulfide detection chamber. In the present invention, the increase in the temperature of the inductor plate is not particularly limited, and a person skilled in the art can reasonably control the increase in the temperature of the inductor plate according to the actual needs in site, as long as the purpose of promoting the reaction rate of hydrogen sulfide with oxygen ions in the metal oxide semiconductor and improving the response time can be achieved.

As a specific embodiment of the process of the present invention, wherein the below-standard radon and hydrogen sulfide or mercury in the deep-seated natural gas are subjected to a harmless treatment comprising:

when the radon in the deep-seated natural gas does not reach the standard, introducing the deep-seated natural gas into the radon treatment chamber; wherein as the deep-seated natural gas flows through the mesh separators, the bioactive adsorbent provided on the surface of the mesh separators adsorbs the radon in the deep-seated natural gas;

when the hydrogen sulfide or mercury in the deep-seated natural gas does not reach the standard, introducing the deep-seated natural gas into the hydrogen sulfide spray removal chamber; wherein the shower device sprays a hydrogen sulfide scavenger from top to bottom into the hydrogen sulfide spray removal chamber, such that the hydrogen sulfide in the deep-seated natural gas is removed by reacting with the hydrogen sulfide scavenger; or introducing the deep-seated natural gas into the mercury treatment chamber, wherein as it flows through the hazardous gas treatment meshes, the mercury in the deep-seated natural gas is removed by the melamine-modified bentonite filled in the hazardous gas treatment meshes;

when the radon and hydrogen sulfide in the deep-seated natural gas do not reach the standard, introducing the deep-seated natural gas into the radon treatment chamber; wherein as the deep-seated natural gas flows through the mesh separators, the bioactive adsorbent provided on the surface of the mesh separators adsorbs the radon in the deep-seated natural gas;

allowing the deep-seated natural gas treated in the radon treatment chamber to enter the hydrogen sulfide spray removal chamber; wherein the shower device sprays a hydrogen sulfide scavenger from top to bottom into the hydrogen sulfide spray removal chamber, such that the hydrogen sulfide in the deep-seated natural gas is removed by reacting with the hydrogen sulfide scavenger;

when the radon and mercury in the deep-seated natural gas do not reach the standard, introducing the deep-seated natural gas into the radon treatment chamber; wherein as the deep-seated natural gas flows through the mesh separators, the bioactive adsorbent provided on the surface of the mesh separators adsorbs the radon and a part of mercury in the deep-seated natural gas; and allowing the deep-seated natural gas treated in the radon treatment chamber to enter the mercury treatment chamber, wherein as it flows through the hazardous gas treatment meshes, the residual mercury in the deep-seated natural gas is removed by the melamine-modified bentonite filled in the hazardous gas treatment meshes.

As an inert gas, radon gas is difficult to chemically react with other substances. Therefore, in the present application, a bioactive adsorbent, such as biological activated carbon is used to adsorb radon gas, and the adsorption efficiency is 98% or more. Meanwhile, since radon gas is a radioactive gas with a half-life of only 3.8 days and will extinguish by spontaneous decay after a week, while the bioactive carbon can maintain its activity for a long time, such method is economical and efficient.

As a specific embodiment of the process of the present invention, the process further comprises: returning the hydrogen sulfide scavenger at the bottom of the hydrogen sulfide spray removal chamber to the shower device, which sprays the hydrogen sulfide scavenger from top to bottom into the hydrogen sulfide spray removal chamber, when treating hydrogen sulfide in deep-seated natural gas.

As a specific embodiment of the process of the present invention, the raw material composition of the hydrogen sulfide scavenger comprises: aqueous methyl diethanolamine solution, complexed iron solution, glycolic aldehyde, and a nitrogen-containing compound.

As a specific embodiment of the process of the present invention, the nitrogen-containing compound comprises one or more of amines, triazines and imines; and the complexed iron solution comprises ethylenediaminetetraacetic acid ferric sodium salt and/or ethylenediamine iron salt solution.

Herein, the reaction to obtain the hydrogen sulfide scavenger from raw material components, such as aqueous methyl diethanolamine solution, complexed iron solution, glycolic aldehyde and a nitrogen-containing compound, is a conventional reaction, and a person skilled in the art can reasonably adjust the process parameters such as temperature and time as well as the amount of each raw material component in the reaction process according to the actual situation on site, as long as the hydrogen sulfide scavenger can be prepared.

The present invention can quantitatively determine the contents of toxic and hazardous gases such as radon, mercury and hydrogen sulfide in deep-seated natural gas, and can realize efficient and harmless treatment of toxic and hazardous gases such as radon, mercury and hydrogen sulfide, thereby providing guarantee for safe exploration, development and production of natural gas.

BRIEF DESCRIPTION OF THE DRAWINGS

In order to more clearly illustrate the technical solutions in the embodiments of the present invention or prior art, the following is a brief description of the accompanying drawings that are required for the description of the embodiments. Obviously, the accompanying drawings in the following description are some embodiments of the present invention, and other accompanying drawings may be obtained on the basis of these drawings for those of ordinary skill in the art without paying creative work.

DESCRIPTION OF MAIN REFERENCE NUMERALS

Figure 1:
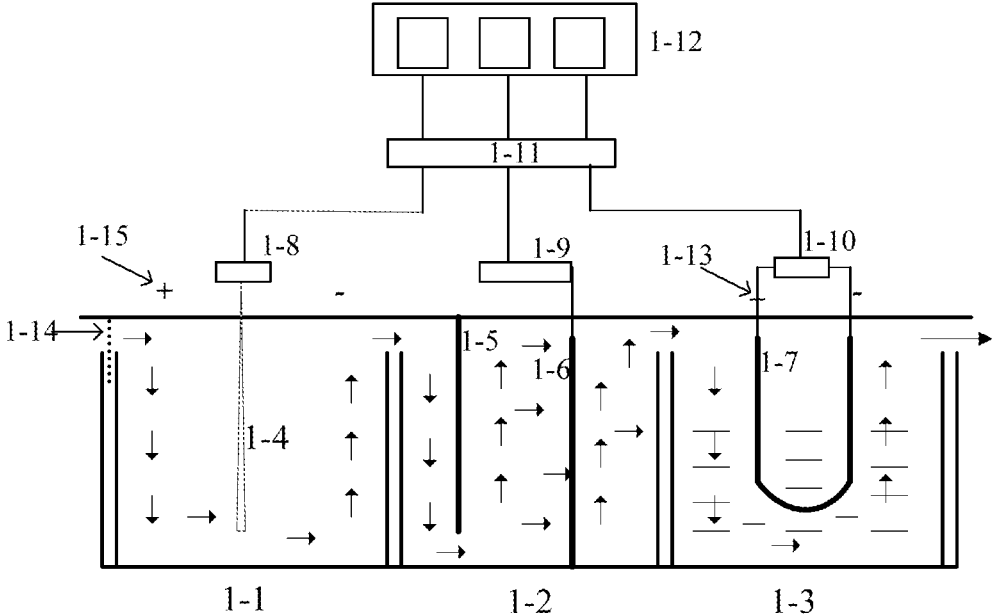
FIG. 1 is a structural schematic diagram of the device for detecting toxic gases in deep-seated natural gas provided in Example 1 of the present invention.
Figure 2:
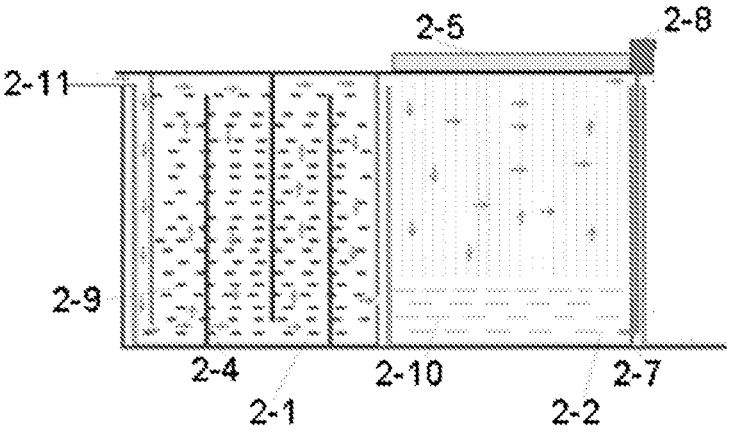
FIG. 2 is a structural schematic diagram of the device for harmless treatment of toxic gases in deep-seated natural gas provided in Example 2 of the present invention.
Figure 3:
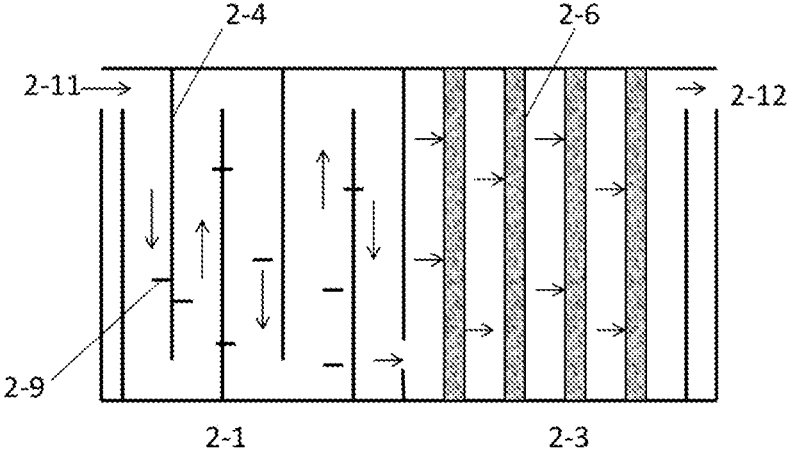
FIG. 3 is a structural schematic diagram of the device for harmless treatment of toxic gases in deep-seated natural gas provided in Example 3 of the present invention.
Figure 4:
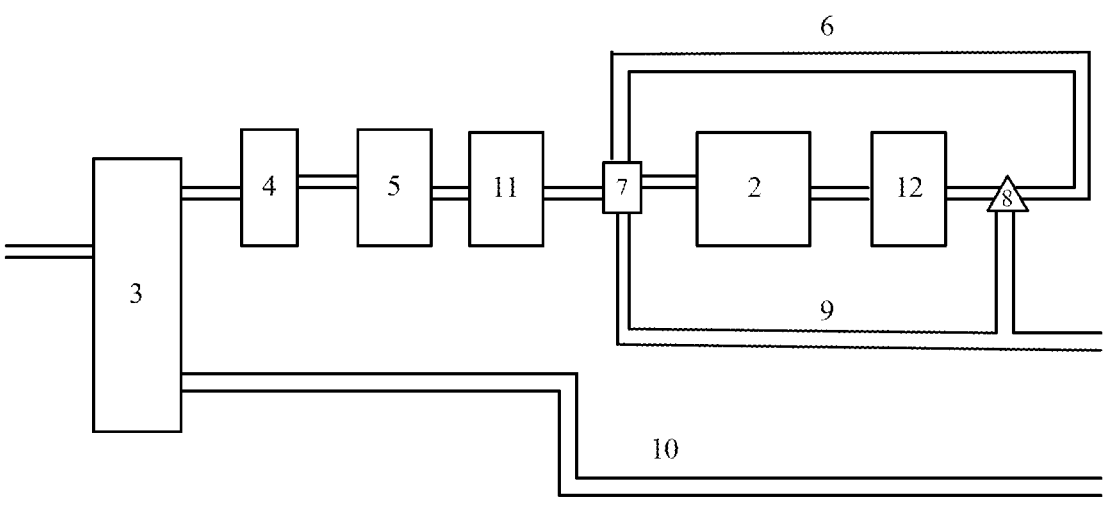
FIG. 4 is a structural schematic diagram of the integrated system for detecting and treating toxic gases in deep-seated natural gas provided in an example of the present invention.
Figure 5:
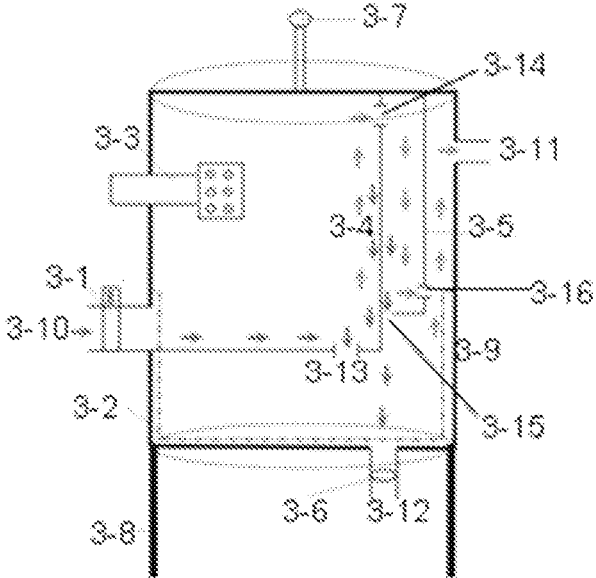
FIG. 5 is a structural schematic diagram of the gas-liquid separation device used in the integrated system for detecting and treating toxic gases in deep-seated natural gas provided in an example of the present invention.

In FIG. 1:
1-1, radon detection chamber; 1-2, hydrogen sulfide detection chamber; 1-3, mercury detection chamber; 1-4, alpha detector; 1-5, heating plate; 1-6, inductor plate; 1-7, U-shaped conductive plate; 1-8, first electrical signal processor; 1-9, second electrical signal processor; 1-10, third electrical signal processor; 1-11, electrical signal amplifier; 1-12, display; 1-13, first power supply; 1-14, filter layer; 1-15, second power supply;

In FIGS. 2 and 3:
2-1, radon treatment chamber; 2-2, hydrogen sulfide spray removal chamber; 2-3, mercury treatment chamber; 2-4, mesh separators; 2-5, shower device; 2-6, hazardous gas treatment meshes; 2-7, circulation pipe; 2-8, circulation pump; 2-9, bioactive adsorbent; 2-10, hydrogen sulfide scavenger; 2-11, gas inlet; 2-12, gas outlet;

In FIG. 4:
11, first device for detecting toxic gases in deep-seated natural gas; 12, second device for detecting toxic gases in deep-seated natural gas; 2, device for harmless treatment of toxic gases in deep-seated natural gas; 3, gas-liquid separation device; 4, cooling and depressurization device; 5, drying device; 6, re-injection pipe; 7, four-way valve; 8, three-way valve; 9, gas transmission pipeline; 10, liquid transmission pipeline;

In FIG. 5:
3-1, flow meter; 3-2, microporous filter mesh; 3-3, flow splitting separator; 3-4, first separator; 3-5, second separator; 3-6, spherical valve; 3-7, pressure gauge; 3-8, bracket; 3-9, cylinder; 3-10, liquid inlet; 3-11, gas outlet; 3-12, liquid outlet; 3-13, first liquid outlet; 3-14, first gas outlet; 3-15, second liquid outlet; 3-16, second gas outlet.

DETAILED DESCRIPTION OF PREFERRED EMBODIMENTS

In order to have a clearer understanding of the technical features, objectives and beneficial effects of the present invention, the following detailed description of the technical solutions of the present invention is given in conjunction with the following specific embodiments, but it is not to be understood as limiting the implementable scope of the present invention.

It is noted that the term "comprise" or "include" or any derivative thereof in the specification and claims of the present invention and the accompanying drawings above, and any variations thereof, are intended to cover non-exclusive inclusion. For example, procedures, processes, systems, products, or apparatus comprising a series of steps or units are not be limited to those steps or units clearly listed, but may include other steps or units not clearly listed but inherent to those procedures, processes, products, or apparatus.

In the present invention, the orientation or positional relationship indicated by the terms "on/above", "under/below", "in/inside", or the like, is based on the orientation or positional relationship shown in the accompanying drawings. These terms are used primarily to better describe the present invention and its embodiments, and are not intended to define that the indicated device, element, or component must have a particular orientation or be constructed and operated in a particular orientation as shown.

Moreover, some of the above terms may be used to denote other meanings in addition to orientation or location relationships. For example, the term "on/above" may also be used in some instances to indicate a dependency or connection relationship. For those of ordinary skill in the art, the specific meaning of these terms can be understood in the context of the present invention.

In addition, the terms "configure", "connect" should be understood in a broad sense. For example, a "connection" may refer to a fixed connection, a detachable connection, or an integral construction, or a mechanical connection or an electrical connection. It may be a direct connection or an indirect connection through an intervening medium. Alternatively, it may be an internal connection between two devices, components or parts. To a person of ordinary skill in the art, the specific meaning of the above terms can be understood in the context of the present invention.

Example 1

This example provides a device for detecting toxic gases in deep-seated natural gas, and the structural schematic diagram thereof is shown in FIG. 1. From FIG. 1, it can be seen that the device comprises:

a display 1-12, an electrical signal amplifier 1-11, a first electrical signal processor 1-8, a second electrical signal processor 1-9, and a third electrical signal processor 1-10, and a radon detection chamber 1-1, a hydrogen sulfide detection chamber 1-2 and a mercury detection chamber 1-3 configured to communicate in this order;

wherein the radon detection chamber 1-1 is provided with an alpha detector 1-4 electrically connected to an input end of the first electrical signal processor 1-8, and an output end of the first electrical signal processor 1-8 is electrically connected to the display 1-12 via the electrical signal amplifier 1-11; a gas inlet of the radon detection chamber 1-1 is provided with a detachable filter layer 1-14 for filtering and removing radon daughters in the deep-seated natural gas; the radon detection chamber 1-1 is further provided with a second power supply 1-15 for applying a voltage to the radon detection chamber 1-1, so as to direct the radon daughters onto the alpha detector 1-4;

wherein the hydrogen sulfide detection chamber 1-2 is provided with a heating plate 1-5 and an inductor plate 1-6 provided with a metal oxide semiconductor on the surface thereof and electrically connected to an input end of the second electrical signal processor 1-9, and an output end of the second electrical signal processor 1-9 is electrically connected to the display 1-12 via the electrical signal amplifier 1-11;

wherein the mercury detection chamber 1-3 contains a permanganate solution and provided with a U-shaped conductive plate 1-7; two conductive plates of the U-shaped conductive plate 1-7 are partially immersed in the permanganate solution, and the portions of the conductive plates that are not immersed in the permanganate solution are electrically connected to an input end of the third electrical signal processor 1-10, and an output end of the third electrical signal processor 1-10 is electrically connected to the display 1-12 via the electrical signal amplifier 1-11; and wherein the mercury detection chamber 1-3 is further provided with a first power supply 1-13 for applying a voltage to the mercury detection chamber 1-3, to cause a voltage difference on the U-shaped conductive plate 1-7 in the mercury detection chamber 1-3 to facilitate the movement of electrons formed in the mercury detection chamber 1-3.

In the device provided by this example, the volume of the permanganate solution is ⅔ of the volume of the mercury detection chamber 1-3.

In the device provided by this example, the U-shaped conductive plate 1-7 is immersed in the permanganate solution to a depth of ½ to ¾.

In the device provided by this example, the permanganate solution may be a potassium permanganate solution, where the concentration of permanganate ($MnO_4^-$) is 0.5 mmol/L.

In the device provided by this example, the alpha detector 1-4 is an Au—Si surface barrier semiconductor detector.

In the device provided by this example, the surface gold plating layer of the Au—Si surface barrier semiconductor detector has thickness of 0.1-0.12 mm.

In the device provided by this example, the heating plate is a platinum heating plate with a thickness of about 1 cm.

In the device provided by this example, the metal oxide semiconductor comprises $Pr_6O_{11}$ and/or $SnO_2$.

In the device provided by this example, the filter layer 1-14 is a filter layer made of glass fiber.

Example 2

This example provides a device for harmless treatment of toxic gases in deep-seated natural gas, and the structural schematic diagram thereof is shown in FIG. 2. From FIG. 2, it can be seen that the device comprises a radon treatment chamber 2-1 and a hydrogen sulfide spray removal chamber 2-2 configured to communicate in this order;

wherein the radon treatment chamber 2-1 is provided with several mesh separators 2-4, and the mesh separators 2-4 are provided with a bioactive adsorbent 2-9 on the surface thereof; and wherein the hydrogen sulfide spray removal chamber 2-2 is provided with a shower device 2-5 on the top thereof, and the shower device 2-5 is used to spray a hydrogen sulfide scavenger 2-10 from top to bottom into the hydrogen sulfide spray removal chamber 2-1.

In the device provided by this example, the separator is a corrosion-resistant quartz sheet.

In the device provided by this example, the bioactive adsorbent is biological activated carbon.

In the device provided by this example, a gas inlet is provided at the side wall of the radon treatment chamber 2-1; the several mesh separators 2-4 are provided in the radon treatment chamber 2-1, perpendicular to the bottom and top surfaces of the radon treatment chamber 2-1, and the several mesh separators 2-4 form an S-shaped gas channel in the radon treatment chamber 2-1.

In the device provided by this example, the hydrogen sulfide spray removal chamber 2-2 is provided with a circulation pipe 2-7 on the inner side wall thereof, and the circulation pipe 2-7 is connected to the shower device 2-5 via a circulation pump 2-8, to return the hydrogen sulfide scavenger to the shower device 2-5.

Example 3

This example provides a device for harmless treatment of toxic gases in deep-seated natural gas, and the structural schematic diagram thereof is shown in FIG. 3. From FIG. 3, it can be seen that the device comprises a radon treatment chamber 2-1 and a mercury treatment chamber 2-3 configured to communicate in this order;

wherein the radon treatment chamber 2-1 is provided with several mesh separators 2-4, and the mesh separators 2-4 are provided with a bioactive adsorbent 2-9 on the surface thereof; and wherein the mercury treatment chamber 2-3 is provided with several hazardous gas treatment meshes 2-6 filled with melamine-modified bentonite.

In the device provided by this example, the separator is a corrosion-resistant quartz sheet.

In the device provided by this example, the bioactive adsorbent is biological activated carbon.

In the device provided by this example, a gas inlet is provided at the side wall of the radon treatment chamber 2-1; the several mesh separators 2-4 are provided in the radon treatment chamber 2-1, perpendicular to the bottom and top surfaces of the radon treatment chamber 2-1, and the several mesh separators 2-4 form an S-shaped gas channel in the radon treatment chamber 2-1.

In the device provided by this example, a gas inlet is provided at the side wall of the mercury treatment chamber 2-3, and the hazardous gas treatment meshes 2-6 are provided in the mercury treatment chamber 2-3, perpendicular to the bottom and top surfaces of the mercury treatment chamber 2-3.

In the device provided by this example, the hazardous gas treatment meshes 2-6 are stainless steel metal meshes.

Example 4

This example provides an integrated system for detecting and treating toxic gases in deep-seated natural gas, and the structural schematic diagram thereof is shown in FIG. 4. From FIG. 4, it can be seen that the device comprises a gas-liquid separation device 3 (as shown in FIG. 5), a cooling and depressurization device 4, a drying device 5, two detection devices for toxic gases in deep-seated natural gas of Example 1 (referred to as a first device for detecting toxic gases in deep-seated natural gas 11 and a second device for detecting toxic gases in deep-seated natural gas 12, respectively), and one device for harmless treatment of toxic gases in deep-seated natural gas 2 provided in Example 2 or Example 3;

wherein the deep-seated natural gas wellhead is connected to an inlet of the gas-liquid separation device 3 via a pipeline, a gas outlet of the gas-liquid separation device 3 is connected to an inlet of the cooling and depressurization device 4 via a pipeline, and the liquid outlet of the gas-liquid separation device 3 is connected to the liquid transmission pipeline 10; a gas outlet of the cooling and depressurization device 4 is connected to a gas inlet of the drying device 5 via a pipeline, a gas outlet of the drying device 5 is connected to an inlet of the first device for detecting toxic gases in deep-seated natural gas 11, and an outlet of the first device for detecting toxic gases in deep-seated natural gas 11 is connected to a gas inlet 2-11 of the device for harmless treatment of toxic gases in deep-seated natural gas 2 and the gas transmission pipeline 9 through the four-way valve 7 via a pipeline; a gas outlet 2-12 of the device for harmless treatment of toxic gases in deep-seated natural gas 2 is connected to an inlet of the second device for detecting toxic gases in deep-seated natural gas 12, and an outlet of the second device for detecting toxic gases in deep-seated natural gas 12 is connected to the gas transmission pipeline 9 through the three-way valve 8 via a pipeline; an outlet of the second device for detecting toxic gases in deep-seated natural gas 12 is also connected to one end of the re-injection pipe 6 through the three-way valve 8 via a pipeline, and the other end of the re-injection pipe 6 is connected to the gas inlet 2-11 of the device for harmless treatment of toxic gases in deep-seated natural gas 2 through the four-way valve 7.

From FIG. 5, it can be seen that the gas-liquid separation device 3 comprises a cylinder 3-9, a bracket 3-8 and a flow splitting separator 3-3;

wherein the cylinder 3-9 is provided on the bracket 3-8 to ensure the stability of the cylinder 3-9; the cylinder 3-9 is cylindrical, and top and bottom covers are provided for sealing the top and bottom of the cylinder;

wherein a liquid inlet 3-10 is provided at the lower part of the side wall of the cylinder 3-9, the liquid inlet 3-10 is provided with a flow meter 3-1 to control the pressure of fluid entering the cylinder; a gas outlet 3-11 is provided in the upper part of the side wall of the cylinder 3-9 on the side opposite to the liquid inlet 3-10;

wherein the cylinder 3-9 has a liquid outlet 3-12 provided in the bottom cover, and a spherical valve 3-6 is provided in the liquid exiting pipeline connected to the liquid outlet 3-12 to control the flow of liquid flowing out of the cylinder 3-9 from the liquid outlet 3-12;

wherein the top cover of the cylinder 3-9 is provided with a small hole for installing a pressure gauge 3-7; the pressure gauge 3-7 is used to monitor the pressure inside the cylinder 3-9 in real time, and together with the flow meter 3-1 and the spherical valve 3-6, to ensure a stable and safe pressure inside the cylinder 3-9;

wherein the cylinder 3-9 is also provided with a microporous filter mesh 3-2, which extends from the side wall of the cylinder 3-9 provided with the liquid inlet 3-10 through the bottom cover of the cylinder 3-9 to the side wall on the other side opposite to the side wall provided with the liquid inlet 3-10, and the microporous filter mesh 3-2 covers the liquid inlet 3-10 and the liquid outlet 3-12 for retaining particles, contaminants, and the like in the fluid;

wherein in this example, the microporous filter mesh 3-2 has a uniform pore size, a porosity of about 60% and a number of pores up to 50 counts/cm 2;

wherein the cylinder 3-9 is also provided with a first separator 3-4 and a second separator 3-5, the first separator 3-4 is inverse L-shaped, and the bottom plate of the inverse L-shaped first separator 3-4 is aligned with the bottom of the liquid inlet 3-10; the first separator 3-4 forms a first gas-liquid separation zone with the side and top walls of the cylinder 3-9, and a first liquid outlet 3-13 is provided at the bottom plate of the inverse L-shaped first separator 3-4 and a first gas outlet 3-14 is provided at the top of the vertical plate of the inverse L-shaped first separator 3-4;

wherein the flow splitting separator 3-3 is provided in the first gas-liquid separation zone for disturbing the fluid entering the gas-liquid separation zone of the cylinder 3-9 and accelerating the gas-liquid separation; and wherein the second separator 3-5 is also inverse L-shaped and is provided outside the first gas-liquid separation zone; the bottom plate of the inverse L-shaped second separator 3-5 is located above the bottom plate of the first separator 3-4, and the height of the bottom plate of the inverse L-shaped second separator 3-5 is not higher than the height of the microporous filter mesh 3-2 on the side wall of the cylinder 3-9; the second separator 3-5 forms a second gas-liquid separation zone with the vertical plate of the first separator 3-4 and the top wall of the cylinder 3-9, to further separate the liquid entering the zone in the second gas-liquid separation zone; a second gas outlet 3-16 is provided at the bottom of the vertical plate of the inverse L-shaped second separator 3-5, and a second liquid outlet 3-15 is formed between the bottom plate of the inverse L-shaped second separator 3-5 and the vertical plate of the first separator 3-4.

The flow splitting separator used in this example may be a conventional flow splitting separator used in this field.

Example 5

This example provides an integrated process for detecting and treating toxic gases in deep-seated natural gas using the integrated system for detecting and treating toxic gases in deep-seated natural gas given in Example 4, comprising:

carrying out a gas-liquid separation on the gas-liquid mixture taken from the deep-seated natural gas well-head to obtain the deep-seated natural gas, using a gas-liquid separation device; wherein the gas-liquid separation process is specifically carried out as follows: the gas-liquid mixture passes through the microporous filter mesh at a stable pressure (2 MPa) after being constrained by the flow meter to retain the particles, pollutants and the like in the fluid; the filtered gas-liquid mixture enters the flow splitting separator; due to the large inertia of the liquid having a high density and the small inertia of the gas having a low density, in the case of a certain gas-liquid ratio, the gas having a low density is more likely to return and eventually flow out of the cylinder into the gas phase pipeline through the gas outlet 3-11, while the liquid having a high density enters the collection wall (the first separator and the second separator) and is carried away by the collection wall into the liquid phase pipeline through the liquid outlet;

subjecting the deep-seated natural gas obtained by separation to cooling and depressurization in order to reduce the temperature and pressure of the deep-seated natural gas to 20° C. and 2 Mpa respectively, where the stable gas stream after cooling and depressurization enters the drying device for drying;

detecting the deep-seated natural gas for radon, hydrogen sulfide and mercury successively, which specifically comprises:

allowing the deep-seated natural gas filtered through the filter layer to enter the radon detection chamber, the hydrogen sulfide detection chamber and the mercury detection chamber successively;

applying a voltage of 3000 V to the radon detection chamber with the second power supply such that the alpha detector collects radon daughters and converts the alpha particle energy, radiated by radon daughters upon alpha decay, into an electric pulse signal; the electric pulse signal is then converted into an electronic signal by the first electric signal processor; the electronic signal is shaped, amplified and converted into a voltage pulse signal by the electric signal amplifier, and then the voltage pulse signal is converted into a radon concentration value by the display and displayed on the display;

increasing the temperature of the inductor plate by the heating plate in the hydrogen sulfide detection chamber; when the hydrogen sulfide is detected by the metal oxide semiconductor provided on the surface of the inductor plate, the hydrogen sulfide reacts with oxygen ions in the metal oxide semiconductor, causing the resistance value of the metal oxide semiconductor to decrease; the second electrical signal processor converts the obtained resistance change signal into an electronic signal; the electronic signal is shaped, amplified and converted into a voltage pulse signal by the electric signal amplifier, and then the voltage pulse signal is converted into a hydrogen sulfide concentration value by the display and displayed on the display;

when the deep-seated natural gas enters the mercury detection chamber, the mercury contained therein reacts with the permanganate to generate electrons, which are collected by the positive and negative electrodes of the first power supply and conducted to the third electrical signal processor through the conductive plate and converted into an electronic signal by the third electrical signal processor; the electronic signal is shaped, amplified and converted into a voltage pulse signal by the electric signal amplifier, and then the voltage pulse signal is converted into a mercury concentration value by the display and displayed on the display.

In the example, each of the radon, hydrogen sulfide and mercury content continuous data is retrieved for 10 min, and the 10-min radon, hydrogen sulfide and mercury content continuous data are averaged as the radon, hydrogen sulfide and mercury contents in the deep-seated natural gas of the target well.

If the detected concentrations of mercury, radon and hydrogen sulfide in the dried deep-seated natural gas reach the standard, the dried deep-seated natural gas is sent to the gas transmission pipeline; if the concentrations of radon and hydrogen sulfide or mercury in the deep-seated natural gas do not reach the standard, a harmless treatment is performed on the below-standard radon and hydrogen sulfide or mercury in the deep-seated natural gas;

the deep-seated natural gas after the harmless treatment is detected for radon, hydrogen sulfide and mercury successively; if the concentrations of mercury, radon and hydrogen sulfide in the deep-seated natural gas reach the standard, the deep-seated natural gas after the harmless treatment is sent to the gas transmission pipeline; if the concentrations of radon and hydrogen sulfide or mercury in the deep-seated natural gas do not reach the standard, the harmless treatment continues to be performed on the below-standard radon and hydrogen sulfide or mercury in the deep-seated natural gas until all concentrations reach the standard.

In this example, the criteria for determining whether the radon, hydrogen sulfide and mercury contents in deep-seated natural gas reach the standard is:

when the mercury concentration is $\leq 0.01$ $\mu g/m^3$, the radon concentration is $\leq 4$ pci/L and the hydrogen sulfide concentration is $\leq 6$ $mg/m^3$ in the deep-seated natural gas, it is determined that the concentrations of mercury, radon and hydrogen sulfide in the deep-seated natural gas reach the standard.

In this example, the below-standard radon and hydrogen sulfide or mercury in the deep-seated natural gas are subjected to a harmless treatment, comprising:

when the radon in the deep-seated natural gas does not reach the standard, introducing the deep-seated natural gas into the radon treatment chamber; wherein as the deep-seated natural gas flows through the mesh separators, the bioactive adsorbent (biological activated carbon) provided on the surface of the mesh separators adsorbs the radon in the deep-seated natural gas;

when the hydrogen sulfide or mercury in the deep-seated natural gas does not reach the standard, introducing the deep-seated natural gas into the hydrogen sulfide spray removal chamber; the shower device sprays a hydrogen sulfide scavenger from top to bottom into the hydrogen sulfide spray removal chamber, such that the hydrogen sulfide in the deep-seated natural gas is removed by reacting with the hydrogen sulfide scavenger; or introducing the deep-seated natural gas into the mercury treatment chamber, wherein as it flows through the hazardous gas treatment meshes, the mercury in the deep-seated natural gas is removed by the melamine-modified bentonite filled in the hazardous gas treatment meshes;

when the radon and hydrogen sulfide in the deep-seated natural gas do not reach the standard, introducing the deep-seated natural gas into the radon treatment chamber; wherein as the deep-seated natural gas flows through the mesh separators, the bioactive adsorbent provided on the surface of the mesh separators adsorbs the radon in the deep-seated natural gas;

allowing the deep-seated natural gas treated in the radon treatment chamber to enter the hydrogen sulfide spray removal chamber; wherein the shower device sprays a hydrogen sulfide scavenger from top to bottom into the hydrogen sulfide spray removal chamber, such that the hydrogen sulfide in the deep-seated natural gas is removed by reacting with the hydrogen sulfide scavenger;

when the radon and mercury in the deep-seated natural gas do not reach the standard, introducing the deep-seated natural gas into the radon treatment chamber; wherein as the deep-seated natural gas flows through the mesh separators, the bioactive adsorbent provided on the surface of the mesh separators adsorbs the radon and a part (about 40%) of mercury in the deep-seated natural gas;

allowing the deep-seated natural gas treated in the radon treatment chamber to enter the mercury treatment chamber, wherein as it flows through the hazardous gas treatment meshes, the residual mercury in the deep-seated natural gas is removed by the melamine-modified bentonite filled in the hazardous gas treatment meshes.

In this example, when treating hydrogen sulfide in the deep-seated natural gas, the hydrogen sulfide scavenger at the bottom of the hydrogen sulfide spray removal chamber may also be returned to the shower device, which sprays it from top to bottom into the hydrogen sulfide spray removal chamber.

In this example, the raw material composition of the hydrogen sulfide scavenger comprises: 20 L of 2.5 mol/L methyl diethanolamine (MDEA) in water, 25 L of 2.0 mol/L complexed iron solution (ethylenediaminetetraacetic acid ferric sodium salt and/or ethylenediamine iron salt solution), and 0.5 L of glycolic aldehyde and a nitrogen-containing compound (e.g., amines, triazines or imines). The reaction time of raw material components is 0.5-1 min, and the reaction temperature is 20-40° C.

In this example, the neutralization reaction between hydrogen sulfide and the hydrogen sulfide scavenger is used for achieve the purpose of removing hydrogen sulfide; in this example, alkaline low molecular polymers (conventional substances) in liquid state may also be added to the hydrogen sulfide scavenger to utilize its complexation for further removal of residual odors of hydrogen sulfide.

In this example, two different deep-seated natural gas samples are taken as examples, and the toxic gases in these two deep-seated natural gas samples are detected and treated respectively by the system provided in Example 4 and according to the above specific process. For the deep-seated natural gas sample 1, it is found that the concentration of mercury and radon do not reach the standard after the first detection, while the concentration of hydrogen sulfide reaches the standard, and thus the radon and mercury can be subjected to a harmless treatment in the device for harmless treatment of toxic gases in deep-seated natural gas provided in Example 3. After the harmless treatment, the toxic gases in deep natural gas are detected again, and it is found that the concentration of radon reaches the standard, but the concentration of mercury still does not reach the standard. At this time, the device for harmless treatment of toxic gases in deep-seated natural gas provided in Example 3 can still be used to treat mercury again, until the detected mercury concentration reaches the standard. For the deep-seated natural gas sample 2, it is found that the concentration of hydrogen sulfide and radon do not reach the standard after the first detection, while the concentration of mercury reaches the standard, and thus the radon and hydrogen sulfide can be subjected to a harmless treatment in the device for harmless treatment of toxic gases in deep-seated natural gas provided in Example 2. After the harmless treatment, the toxic gases in deep natural gas are detected again, and it is found that the concentration of radon reaches the standard, but the concentration of hydrogen sulfide still does not reach the standard. At this time, the device for harmless treatment of toxic gases in deep-seated natural gas provided in Example 2 can still be used to treat hydrogen sulfide again, until the detected hydrogen sulfide concentration reaches the standard. The experimental parameters and the obtained experimental results are shown in Table 1 below.

TABLE 1

| | Deep-seated natural gas sample 1 | Deep-seated natural gas sample 2 |
|---|---|---|
| Gas pressure, MPa | 2 | |
| Gas temperature, ° C. | 20 | |
| Gas flow rate, mL/min | 1000 | |
| Initial mercury concentration, $\mu g/m^3$ | 70 | 0.007 |
| Initial hydrogen sulfide concentration, $mg/m^3$ | 5 | 2300 |
| Initial radon concentration, $Bq/m^3$ | 200 | 132 |
| Mercury concentration in off-gas after the first harmless treatment, $\mu g/m^3$ | 0.5 | — |
| Hydrogen sulfide concentration in off-gas after the first harmless treatment, $mg/m^3$ | — | 22 |
| Radon concentration in off-gas after the first harmless treatment, $Bq/m^3$ | 3.5 | 2.1 |
| Mercury concentration in off-gas after the second harmless treatment, $\mu g/m^3$ | 0.008 | — |

TABLE 1-continued

| | Deep-seated natural gas sample 1 | Deep-seated natural gas sample 2 |
|---|---|---|
| Hydrogen sulfide concentration in off-gas after the second harmless treatment, $mg/m^3$ | — | 5.3 |
| Mercury treatment efficiency, % | 99.99 | — |
| Hydrogen sulfide treatment efficiency, % | — | 99.04 |
| Radon gas treatment efficiency, % | 98.25 | 99.77 |

From Table 1 above, it can be seen that the process provided in the examples of the present invention can quantitatively determine the contents of toxic and hazardous gases such as radon, mercury and hydrogen sulfide in deep-seated natural gas, and can realize efficient and harmless treatment of toxic and hazardous gases such as radon, mercury and hydrogen sulfide, thereby providing guarantee for safe exploration, development and production of natural gas.

The above description is merely specific examples of the present invention and cannot be used to limit the implementable scope of the invention. Therefore, the replacement of equivalent components or equivalent changes and modifications made in accordance with the protection scope of the present patent for invention shall still fall within the scope encompassed by the present patent. In addition, arbitrary combinations of technical features and technical features, technical features and technical inventions, and technical inventions and technical inventions of the present invention can be used.

The invention claimed is:

1. A device for detecting toxic gases in natural gas, comprising: a power supply, a display, an electrical signal amplifier, a first electrical signal processor, a second electrical signal processor, a third electrical signal processor, a radon detection chamber, a hydrogen sulfide detection chamber and a mercury detection chamber configured to communicate in this order;

wherein the radon detection chamber is provided with an alpha detector electrically connected to an input end of the first electrical signal processor, and an output end of the first electrical signal processor is electrically connected to the display via the electrical signal amplifier; a gas inlet of the radon detection chamber is provided with a detachable filter layer for filtering and removing radon daughters in the natural gas;

wherein the hydrogen sulfide detection chamber is provided with a heating plate and an inductor plate, the inductor plate is provided with a metal oxide semiconductor on a surface thereof and is electrically connected to an input end of the second electrical signal processor, and an output end of the second electrical signal processor is electrically connected to the display via the electrical signal amplifier;

wherein the mercury detection chamber contains a permanganate solution and is provided with two conductive plates partially immersed in the permanganate solution, and the portions of the conductive plates that are not immersed in the permanganate solution are electrically connected to an input end of the third electrical signal processor, and an output end of the third electrical signal processor is electrically connected to the display via the electrical signal amplifier; and wherein the power supply is used to apply a voltage to each of the radon detection chamber and the mercury detection chamber.

2. The device according to claim 1, wherein the volume of the permanganate solution is ½ to ⅔ of the volume of the mercury detection chamber.

3. The device according to claim 1, wherein the alpha detector is an Au—Si surface barrier semiconductor detector, and wherein the Au—Si surface barrier semiconductor detector has a surface gold plating layer with a thickness of 0.1-0.12 mm.

4. The device according to claim 1, wherein the metal oxide semiconductor comprises $Pr_6O_{11}$ and/or $SnO_2$.

5. An integrated system for detecting and treating toxic gases in natural gas, comprising: a cooling and depressurization device, a drying device, two devices for detecting toxic gases in natural gas according to claim 1, and a device for harmless treatment of toxic gases in natural gas;
   wherein a gas outlet of the cooling and depressurization device is connected to a gas inlet of the drying device via a pipeline, a gas outlet of the drying device is connected to an inlet of a first device for detecting toxic gases in natural gas via a pipeline, an outlet of the first device for detecting toxic gases in natural gas is connected to an inlet of the device for harmless treatment of toxic gases in natural gas and to a gas transmission pipeline via a pipeline respectively; an outlet of the device for harmless treatment of toxic gases in natural gas is connected to an inlet of a second device for detecting toxic gases in natural gas via a pipeline, and an outlet of the second device for detecting toxic gases in natural gas is connected to an inlet of the device for harmless treatment of toxic gases in natural gas and to a gas transmission pipeline via a pipeline respectively.

6. The system according to claim 5, further comprising a gas-liquid separation device, wherein a natural gas wellhead is connected to an inlet of the gas-liquid separation device via a pipeline, and a gas outlet of the gas-liquid separation device is connected to an inlet of the cooling and depressurization device via a pipeline.

7. The system according to claim 5, wherein the device for harmless treatment of toxic gases in natural gas comprises a radon treatment chamber; the radon treatment chamber is provided with several mesh separators each provided with a bioactive adsorbent on the surface thereof.

8. The system according to claim 7, wherein the bioactive adsorbent is biological activated carbon.

9. The system according to claim 7, wherein the several mesh separators are provided in the radon treatment chamber, perpendicular to the direction of the gas entering the gas inlet of the radon treatment chamber, and the several mesh separators form an S-shaped gas channel in the radon treatment chamber.

10. The system according to claim 7, wherein the device for harmless treatment of toxic gases in natural gas further comprises a hydrogen sulfide spray removal chamber and/or a mercury treatment chamber; wherein when the device for harmless treatment of toxic gases in natural gas comprises the radon treatment chamber and the hydrogen sulfide spray removal chamber, or comprises the radon treatment chamber and the mercury treatment chamber, the radon treatment chamber and the hydrogen sulfide spray removal chamber are configured to communicate in this order, and the radon treatment chamber and the mercury treatment chamber are configured to communicate in this order;
   wherein the hydrogen sulfide spray removal chamber is provided with a shower device on the top thereof, and the shower device is used to spray a hydrogen sulfide scavenger from top to bottom into the hydrogen sulfide spray removal chamber; and
   wherein the mercury treatment chamber is provided with several hazardous gas treatment meshes filled with melamine-modified bentonite.

11. The system according to claim 10, wherein the hydrogen sulfide spray removal chamber is provided with a circulation pipe on the inner side wall thereof, and the circulation pipe is connected to the shower device via a circulation pump to return the hydrogen sulfide scavenger to the shower device.

12. The system according to claim 10, wherein the hazardous gas treatment meshes are provided in the mercury treatment chamber, perpendicular to the direction of the gas entering the gas inlet of the mercury treatment chamber.

13. An integrated process for detecting and treating toxic gases in natural gas by using the integrated system for detecting and treating toxic gases in natural gas according to claim 5, comprising:
   drying the natural gas after cooling and depressurization;
   detecting the dried natural gas for radon, hydrogen sulfide, and mercury successively;
   sending the dried natural gas to the gas transmission pipeline if the detected concentrations of mercury, radon and hydrogen sulfide in the dried natural gas reach the standard; or preforming a harmless treatment on the below-standard radon and hydrogen sulfide or mercury in the natural gas if the detected concentrations of radon and hydrogen sulfide or mercury in the dried natural gas do not reach the standard; and
   detecting the natural gas after the harmless treatment for radon, hydrogen sulfide and mercury successively, and sending the natural gas after the harmless treatment to the gas transmission pipeline if the concentrations of mercury, radon and hydrogen sulfide in the natural gas reach the standard; or continuing to perform the harmless treatment on the below-standard radon and hydrogen sulfide or mercury in the natural gas if the concentrations of radon and hydrogen sulfide or mercury in the natural gas do not reach the standard, until all concentrations reach the standard.

14. The process according to claim 13, wherein when the mercury concentration is $\leq 0.01$ $\mu g/m^3$, the radon concentration is $\leq 4$ pci/L and the hydrogen sulfide concentration is $\leq 6$ $mg/m^3$ in the natural gas, it is determined that the concentrations of mercury, radon and hydrogen sulfide in the natural gas reach the standard.

15. The process according to claim 13, wherein the detecting the natural gas for radon, hydrogen sulfide and mercury successively comprises:
   allowing the natural gas filtered through the filter layer to enter the radon detection chamber, the hydrogen sulfide detection chamber, and the mercury detection chamber successively;
   applying a voltage to the radon detection chamber, such that the alpha detector collects radon daughters, and converts the alpha particle energy, radiated by the radon daughters upon alpha decay, into an electric pulse signal; the electric pulse signal is then converted into an electronic signal by the first electric signal processor; the electronic signal is shaped, amplified and converted into a voltage pulse signal by the electric signal amplifier, and then the voltage pulse signal is converted into a radon concentration value by the display and displayed on the display; and increasing the temperature of the inductor plate by the heating plate in the hydrogen sulfide detection chamber, wherein:

when the metal oxide semiconductor provided on the surface of the inductor plate detects hydrogen sulfide, the hydrogen sulfide reacts with oxygen ions in the metal oxide semiconductor, causing the resistance value of the metal oxide semiconductor to decrease; the second electrical signal processor converts the obtained resistance change signal into an electronic signal; and the electronic signal is shaped, amplified and converted into a voltage pulse signal by the electric signal amplifier, and then the voltage pulse signal is converted into a hydrogen sulfide concentration value by the display and displayed on the display; and when the natural gas enters the mercury detection chamber, the mercury contained therein reacts with the permanganate to generate electrons, which are collected by the positive and negative electrodes of the power supply and conducted to the third electrical signal processor through the conductive plate and converted into an electronic signal by the third electrical signal processor; and the electronic signal is shaped, amplified and converted into a voltage pulse signal by the electric signal amplifier, and then the voltage pulse signal is converted into a mercury concentration value by the display and displayed on the display.

16. The process according to claim 15, wherein the concentrations of mercury, radon and hydrogen sulfide of the dried natural gas are detected for a period of time respectively, and the concentrations of mercury, radon and hydrogen sulfide obtained continuously for the period of time are averaged respectively as the mercury concentration, radon concentration and hydrogen sulfide concentration in the natural gas.

17. The process according to claim 15, wherein the voltage applied to the radon detection chamber is 1500-3000 V.

18. The process according to claim 13, wherein the below-standard radon and hydrogen sulfide or mercury in the natural gas are subjected to a harmless treatment comprising:

when the radon in the natural gas does not reach the standard, introducing the natural gas to the radon treatment chamber; wherein as the natural gas flows through the mesh separators, the bioactive adsorbent provided on the surface of the mesh separators adsorbs the radon in the natural gas;

when the hydrogen sulfide or mercury in the natural gas does not reach the standard, introducing the natural gas to the hydrogen sulfide spray removal chamber; wherein the shower device sprays a hydrogen sulfide scavenger from top to bottom into the hydrogen sulfide spray removal chamber, such that the hydrogen sulfide in the natural gas is removed by reacting with the hydrogen sulfide scavenger; or introducing the natural gas to the mercury treatment chamber, wherein as it flows through the hazardous gas treatment meshes, the mercury in the deep-seated natural gas is removed by the melamine-modified bentonite filled in the hazardous gas treatment meshes;

when the radon and hydrogen sulfide in the natural gas do not reach the standard, introducing the natural gas to the radon treatment chamber; wherein as the natural gas flows through the mesh separators, the bioactive adsorbent provided on the surface of the mesh separators adsorbs the radon in the deep-seated natural gas; allowing the natural gas treated in the radon treatment chamber to enter the hydrogen sulfide spray removal chamber; wherein the shower device sprays a hydrogen sulfide scavenger from top to bottom into the hydrogen sulfide spray removal chamber, such that the hydrogen sulfide in the natural gas is removed by reacting with the hydrogen sulfide scavenger; and when the radon and mercury in the natural gas do not reach the standard, introducing the natural gas to the radon treatment chamber; wherein as the natural gas flows through the mesh separators, the bioactive adsorbent provided on the surface of the mesh separators adsorbs the radon and a part of mercury in the natural gas; and allowing the natural gas treated in the radon treatment chamber to enter the mercury treatment chamber, wherein as it flows through the hazardous gas treatment meshes, the residual mercury in the natural gas is removed by the melamine-modified bentonite filled in the hazardous gas treatment meshes.

19. The process according to claim 18, further comprising: when hydrogen sulfide in natural gas is treated, returning the hydrogen sulfide scavenger at the bottom of the hydrogen sulfide spray removal chamber to the shower device, which sprays the hydrogen sulfide scavenger from top to bottom into the hydrogen sulfide spray removal chamber.

20. The process according to claim 18, wherein the raw material composition of the hydrogen sulfide scavenger comprises an aqueous methyl diethanolamine solution, a complexed iron solution, glycolic aldehyde, and a nitrogen-containing compound, wherein the nitrogen-containing compound comprises one or more of amines, triazines and imines; and wherein the complexed iron solution comprises ethylenediaminetetraacetic acid ferric sodium salt and/or ethylenediamine iron salt solution.

* * * * *